(12) United States Patent
Bou et al.

(10) Patent No.: US 6,392,662 B1
(45) Date of Patent: *May 21, 2002

(54) DRAW ORDER PRESERVATION IN A COMPUTER-IMPLEMENTED GRAPHICS SYSTEM

(75) Inventors: Robert E. Bou, Austin, TX (US); Jack M. Bayt, Clovis, CA (US)

(73) Assignee: Autodesk, Inc., San Rafael, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,690

(22) Filed: Jan. 7, 1999

(51) Int. Cl.[7] .......................... G09G 5/00; G06K 11/06
(52) U.S. Cl. ................... 345/665; 345/790; 178/18.01; 178/18.03
(58) Field of Search ................... 345/339, 333, 345/418, 112, 115, 435, 433, 441, 145, 964, 757, 788, 790, 791, 792, 793, 794, 795, 796, 798, 665, 619; 707/502; 178/18.01, 18.02, 18.03, 18.07

(56) References Cited

U.S. PATENT DOCUMENTS

| | | | |
|---|---|---|---|
| 5,101,436 A | * | 3/1992 | DeAguiar et al. ............ 382/1 |
| 5,377,314 A | * | 12/1994 | Bates et al. .................. 395/135 |
| 5,664,128 A | * | 9/1997 | Bauer et al. ................. 345/708 |
| 5,754,177 A | * | 5/1998 | Hama et al. ................. 345/339 |
| 5,857,707 A | * | 1/1999 | Devlin ......................... 283/56 |
| 5,889,527 A | * | 3/1999 | Tsai ............................ 345/435 |
| 5,895,476 A | * | 4/1999 | Orr et al. ..................... 707/517 |
| 5,900,002 A | * | 5/1999 | Bottomly ..................... 707/517 |
| 6,018,333 A | * | 1/2000 | Denber ........................ 345/145 |
| 6,124,861 A | * | 9/2000 | Lebovitz et al. ............. 345/433 |
| 6,144,974 A | * | 11/2000 | Gartland ...................... 707/517 |
| 6,219,052 B1 | * | 4/2001 | Gould ......................... 345/341 |

OTHER PUBLICATIONS

Ulrich, Laurie Ann and Edward Willett. Using Microsoft PowerPoiint 97, Que Corporation (1998), pp. 172–175, 422–430.*

Haddad, Alexandria and Christopher. Teach Yourself PowerPoint 97 in 10 Minutes, Sam's Publishing (1998), pp. 102–103, 107.*

* cited by examiner

Primary Examiner—Raymond J. Bayerl
Assistant Examiner—Thomas J Joseph
(74) Attorney, Agent, or Firm—Gates & Cooper LLP

(57) ABSTRACT

A user-selectable option for preserving draw order upon selection of an object displayed on a monitor. Once the object is selected from among a plurality of objects displayed on the monitor, at least a portion of an area displayed on the monitor is redrawn in a manner that visually identifies the selected object while preserving a draw order of the objects displayed on the monitor.

24 Claims, 8 Drawing Sheets

DRAW ORDER PRESERVATION IN A COMPUTER-IMPLEMENTED GRAPHICS SYSTEM

BACKGROUND OF THE INVENTION

1. Field of the Invention

The present invention relates generally to computer-implemented graphics systems, and in particular, to a method, apparatus, and article of manufacture for providing draw order preservation during object selection in a computer-implemented graphics system.

2. Description of the Related Art

Computer-implemented graphics systems have been widely used by designers, illustrators, drafters, and engineers for a number of years. Most such graphics systems use a graphical user interface (GUI) to display graphical images, such as 2D or 3D models, schematic diagrams, photorealistic images, etc.

In many instances, the graphical images are comprised of multiple layers of multiple objects, where the draw order of the objects is important to the overall composition of the graphical image. Typical systems allow for the reordering and maintenance of draw order with the overall document. However, most graphics systems alter the draw order when an object is selected, bringing the selected object to the "front" of the other objects in the graphical image, generally until a full "regen" or "repaint" is manually invoked.

This may be a problem visually, if the alteration of the draw order alters the composition of the graphical image. For example, if the selected object is a raster image and the other objects are vector images, the raster image will cover the vector images until the raster image is moved it to the "back" of the vector images again. This can be a time-consuming, error prone process, and may render certain operations impossible to perform, such as when the images in front are to be used as a reference for the operations on the selected object.

There is a need in the art, then, for techniques that simplify such selections. Specifically, there is a need in the art for a technique for selecting objects from an image displayed by a computer without altering the draw order of the objects.

SUMMARY OF THE INVENTION

To address the requirements described above, the present invention discloses a method, apparatus, and article of manufacture for providing a user-selectable option for preserving draw order upon selection of an object displayed on a monitor. Once the object is selected from among a plurality of objects displayed on the monitor, at least a portion of an area displayed on the monitor is redrawn in a manner that visually identifies the selected object while preserving a draw order of the objects displayed on the monitor.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The preferred embodiment of the present invention describes a user interface that allows images to be kept in correct order during the selection process. Normally, when a user selects an object from among multiple objects on the display, the selected object will be moved to the "front" of the other objects on the display. This is visually a problem if the selected object is a raster image and the other objects are vector images, because the raster image will cover all the vector images until the raster image is moved it to the "back" of the vector images again. The present invention eliminates this time consuming process by providing a user-selectable option of preserving the draw order for objects.

Hardware Environment

Figure 1:
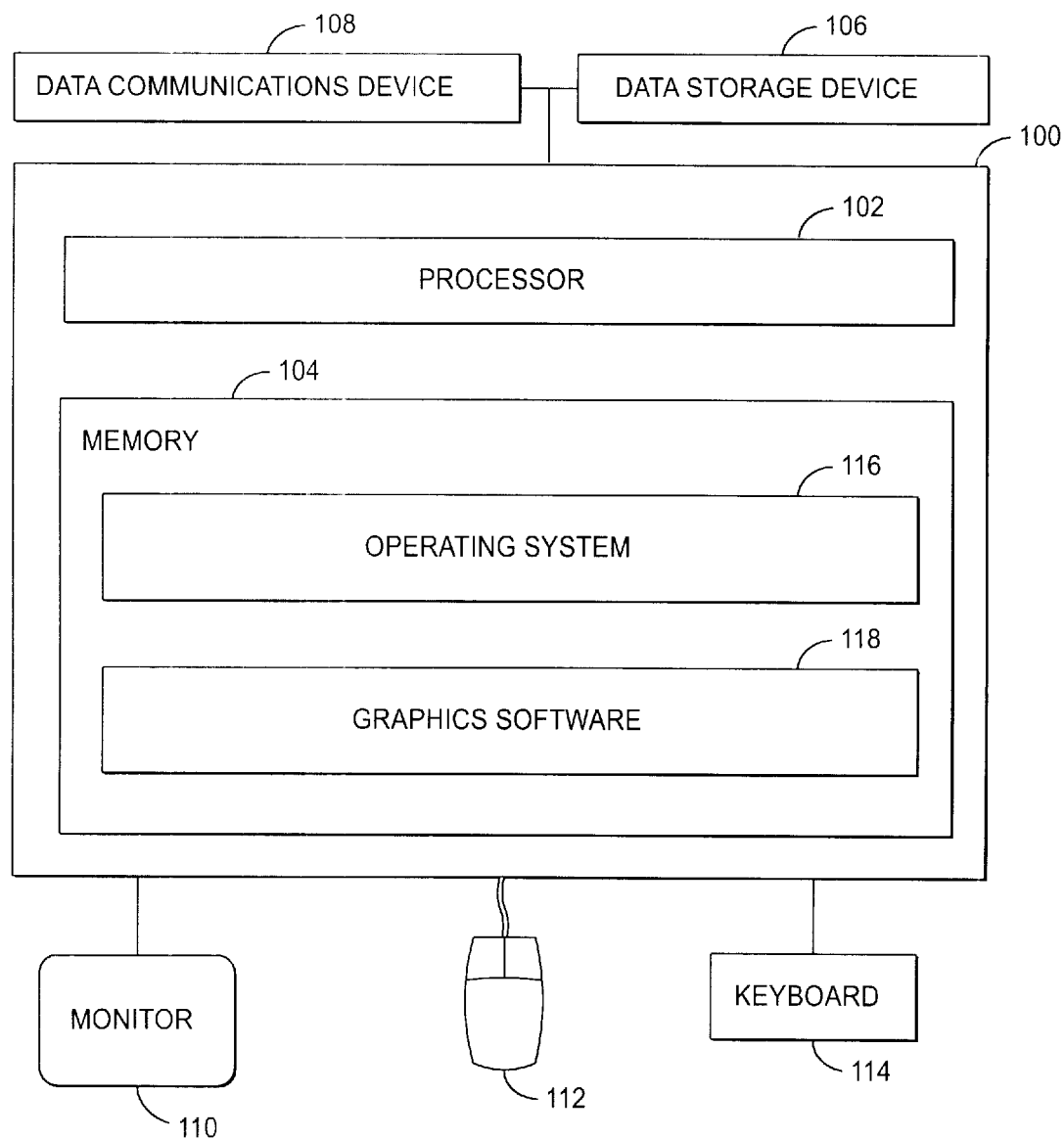
FIG. 1 is an exemplary hardware environment used to implement the preferred embodiment of the invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 usually operates under the control of an operating system 116. The present invention is usually implemented by computer-implemented graphics software 118 that operates under the control of the operating system 116. In the preferred embodiment, the graphics software 118 is the AUTOCAD® program sold by Autodesk, Inc., the assignee of the present invention.

However, it should be understood that, in the alternative, the present invention may also apply to other computer programs or to specific utilities or functions within the operating system 116 itself. In general, the functions performed in the present invention, whether implemented as part of an operating system 116 or a specific computer program 118, will be referred to herein as "computer programs".

Generally, the operating system 116 and graphics software 118 comprise logic and/or data embodied in or readable from a device, media, or carrier, e.g., one or more fixed and/or removable data storage devices 106 connected directly or indirectly to the computer 100, one or more remote devices coupled to the computer 100 via the data communications devices 108, etc.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Computer-Implemented Graphics Software

Figure 2:
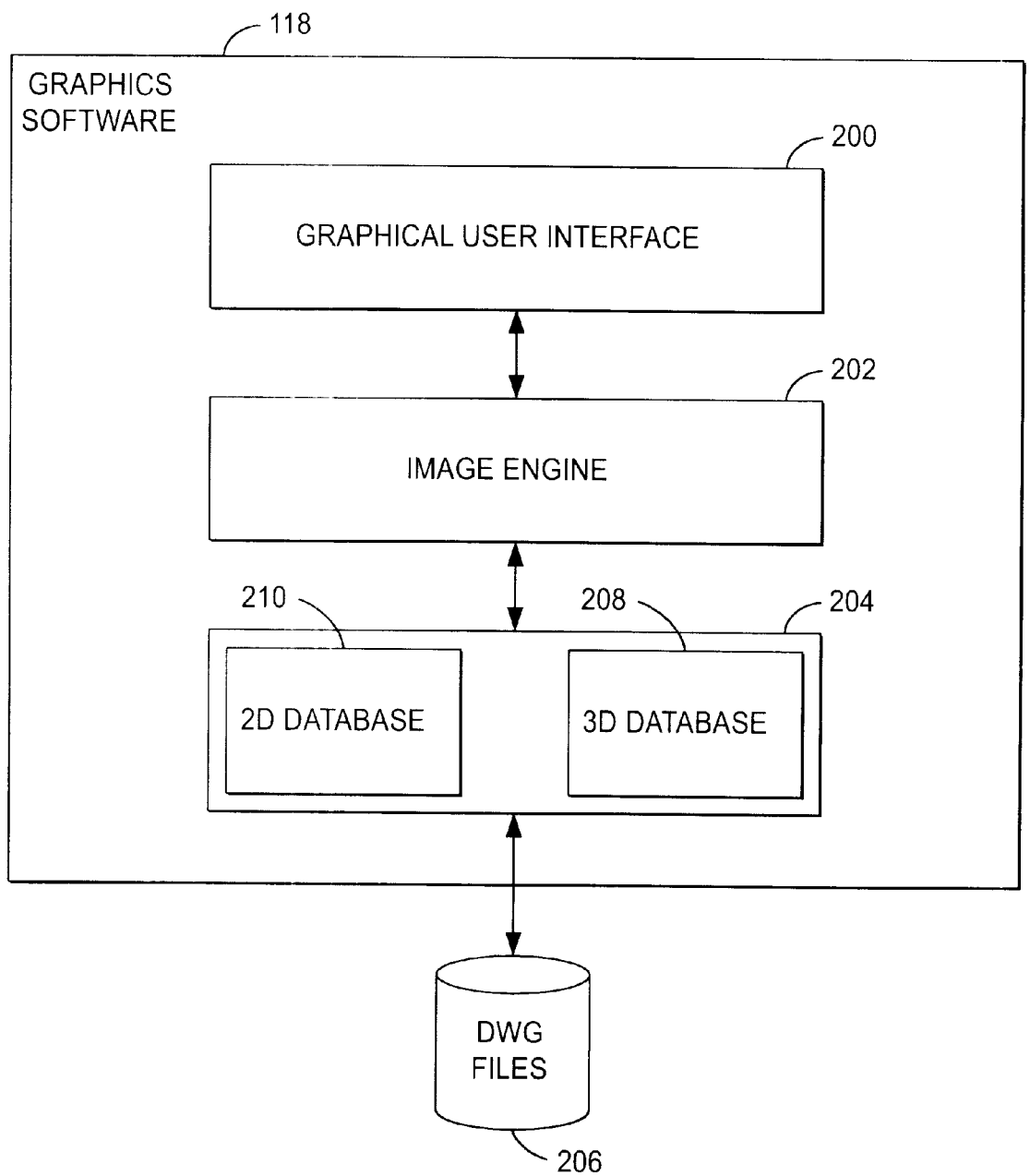
FIG. 2 is a block diagram that illustrates the components of the computer-implemented graphics software according to the preferred embodiment of the present invention.

FIG. 2 is a block diagram that illustrates the components of the graphics software 118 according to the preferred embodiment of the present invention. There are three main components to the graphics software 118, including: a Graphical User Interface (GUI) 200, an Image Engine (IME) 202, and a database (DB) 204 for storing objects in Drawing (DWG) files 206.

The Graphical User Interface 200 displays information to the user and provides the functionality for the user's interaction with the graphics software 118.

The Image Engine 202 processes the DWG files 206 and delivers the resulting graphics to the monitor 110 for display. In the preferred embodiment, the Image Engine 202 provides a complete application programming interface (API) that allows other computer programs to interface to the graphics software 118 as needed.

The Database 204 is comprised of two separate types of databases: (1) a 3D database 208 known as the "world space" that holds all 3D information; and (2) one or more 2D databases 210 known as the "virtual spaces" that hold all 2D-only display and selection information.

Display and Selection List

Figure 3:
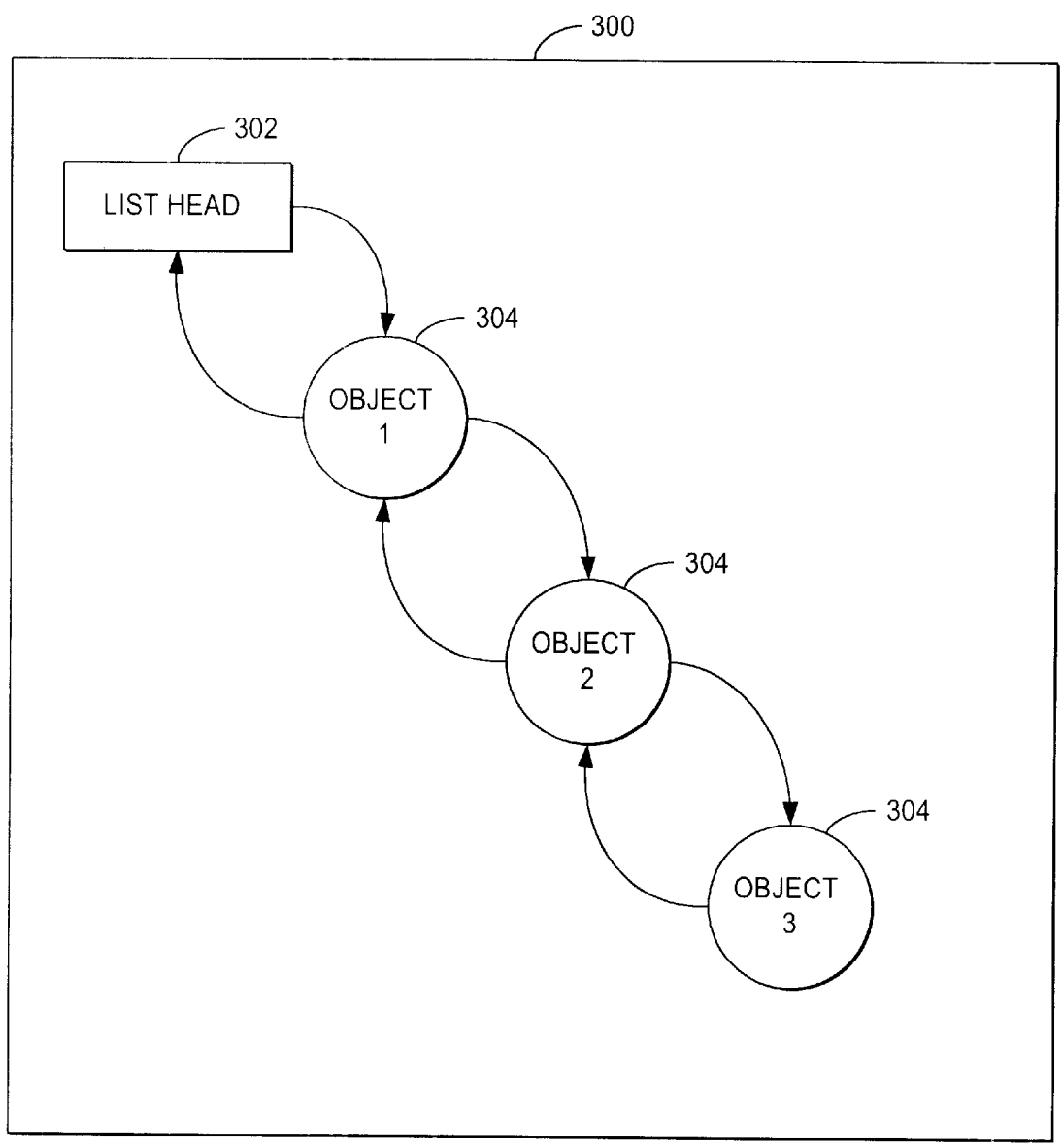
FIG. 3 is a block diagram that illustrates the structure of a display and selection list maintained by each of the two-dimensional databases of the computer-implemented graphics software according to the preferred embodiment of the present invention.

FIG. 3 is a block diagram that illustrates the structure of a display and selection list 300 maintained by each of the 2D databases 210 according to the preferred embodiment of the present invention. The display and selection list 300 is usually comprised of a doubly linked list having a list head 302 and one or more list objects 304, although other structures may be used as well. Generally, the objects 304 are ordered in the display and selection list 300 according to their order of creation, although the order of objects 304 in the list 300 may be changed at anytime.

Because most of the information in the world space is not needed to represent a drawing on the monitor 110, the graphics software 118 creates the list 300 (also known as a refresh list) to maintain the screen coordinates of the various objects 304 for the virtal space, which corresponds to a "viewport" displayed on the monitor 110. There exists a separate 2D database 210 for every open viewport, wherein the 2D databases 210 comprise the main working databases and thus are directly responsible for transferring drawing and editing information from the 3D database 208 to the monitor 110.

If the user requests a view that is outside the current virtual space, the graphics software 118 extracts a new virtual space from world space by performing a complete regeneration, also referred to as a "regen", and then creates a viewport for the virtual space. When the user zooms and pans within the current virtual space, the graphics software 118 maps the new coordinates for the virtual space to the corresponding viewport, thereby resulting in a redraw operation.

Moreover, when the user edits one or more objects 304, this operation affects all the databases 208 and 210. Specifically, if the user creates an object 304, the graphics software 118 first adds it to the 3D database 208, then adds it to all the 2D databases 210, and finally displays the 2D information to all the viewports. If the user erases an object 304, the same process occurs. However, if the user modifies an object 304, then the graphics software 118 has to perform an even more complex series of calculations: it must update the 3D database 208, select and delete the original object 304 from all 2D databases 210, insert the modified object 304 into all 2D databases 210, and finally re-display all 2D information to every viewport.

Draw Order Preservation

Figure 4A:
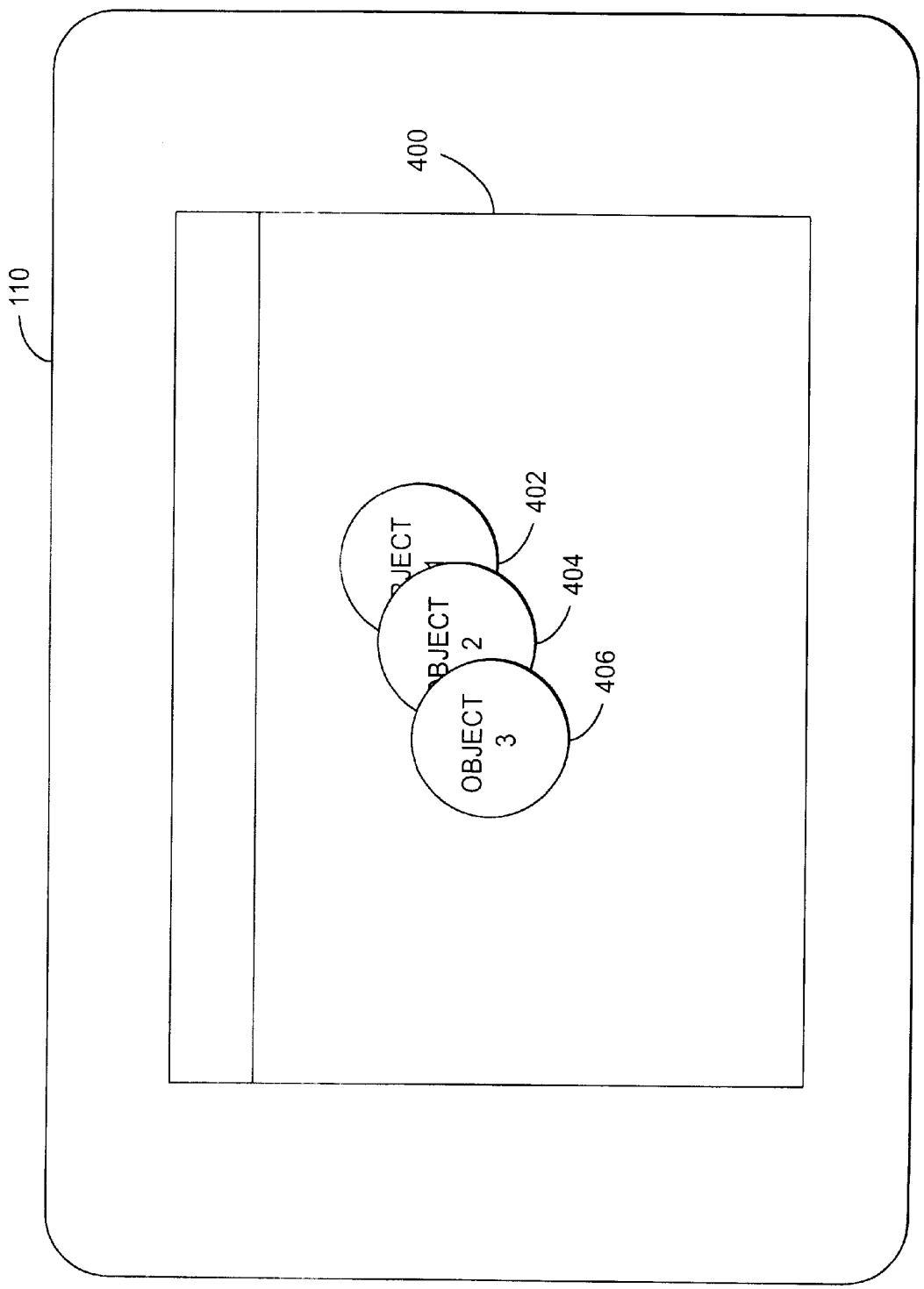
FIGS. 4A and 4B are block diagrams that illustrate a viewport displayed on a monitor by the computer-implemented graphics software according to the preferred embodiment of the present invention.
Figure 4B:
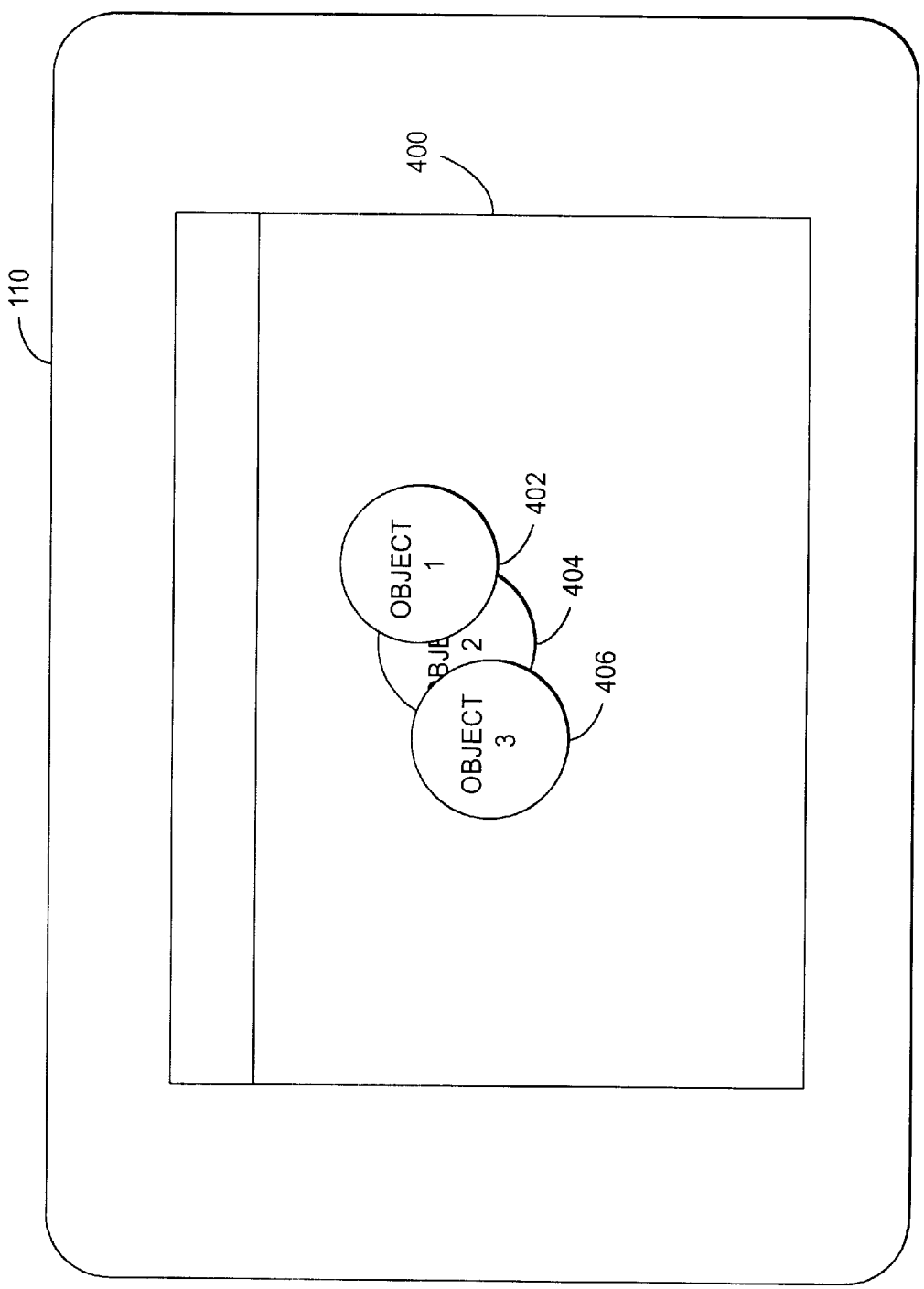

FIGS. 4A and 4B are block diagrams that illustrate a viewport 400 displayed on a monitor 110 by the graphics software 118 according to the preferred embodiment of the present invention. This viewport 400 includes a plurality of visual representations 402, 404, and 406 of a plurality of objects 304 from the associated 2D database 208. Note that, in FIG. 4A, the visual representations 402, 404, 406 are layered and thus visual representation 404 obscures part of (i.e., is in "front" of) visual representation 402 and visual representation 406 obscures part of (i.e., is in "front" of) visual representation 404.

FIG. 4B illustrates that, when the user selects an image, it will be moved to the front of the other images. In FIG. 4B, visual representation 402 has been selected and thus it moves to the front of visual representation 404. Visually, this is a problem in many situations, such as where the user has selected a visual representation of a raster image object that then obscures a vector object intended to be in "front" of the raster image object, until the user moves the raster image object to the "back" of the vector object again. The present invention eliminates this time consuming process and provides a user-selectable option of always preserving the draw order of objects displayed by the graphics software 118.

Logic of the Invention

Figure 5:
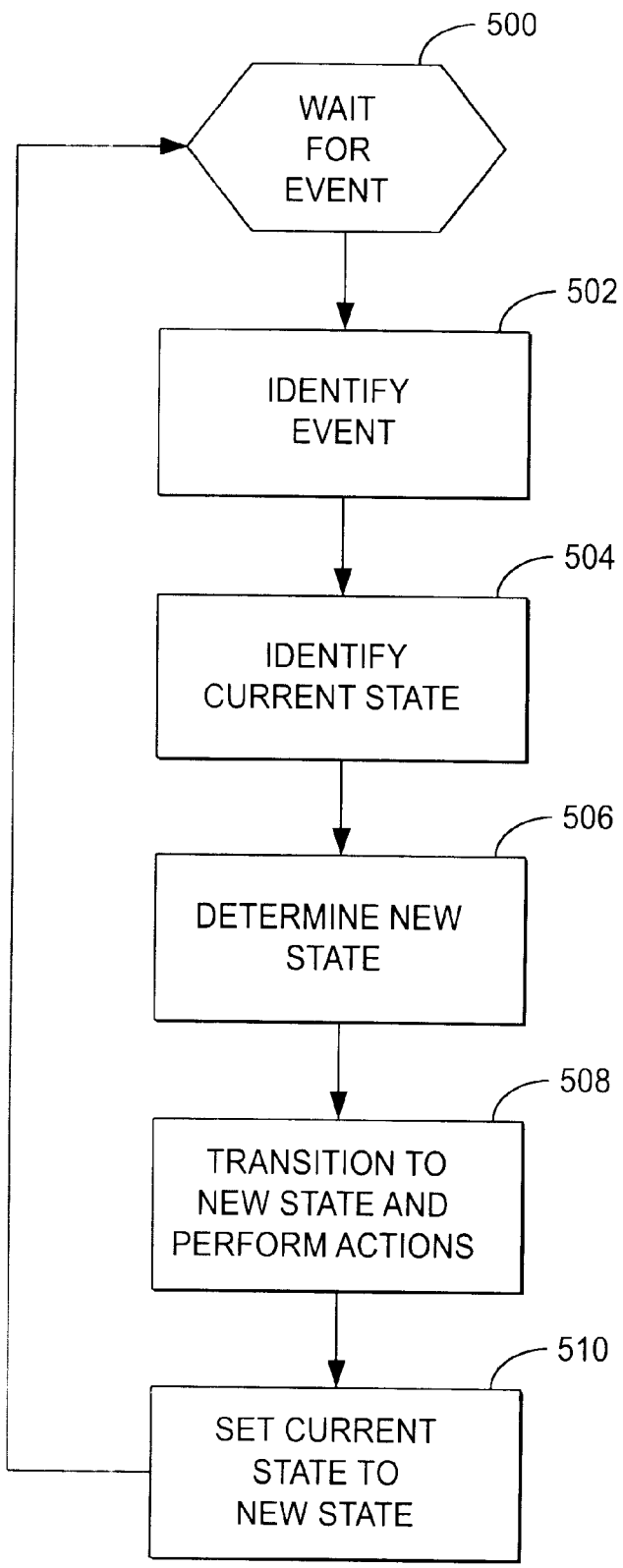
FIG. 5 is a flowchart that illustrates the general logic of a message or event-driven computer performing the steps of the preferred embodiment of the present invention.
Figure 6:
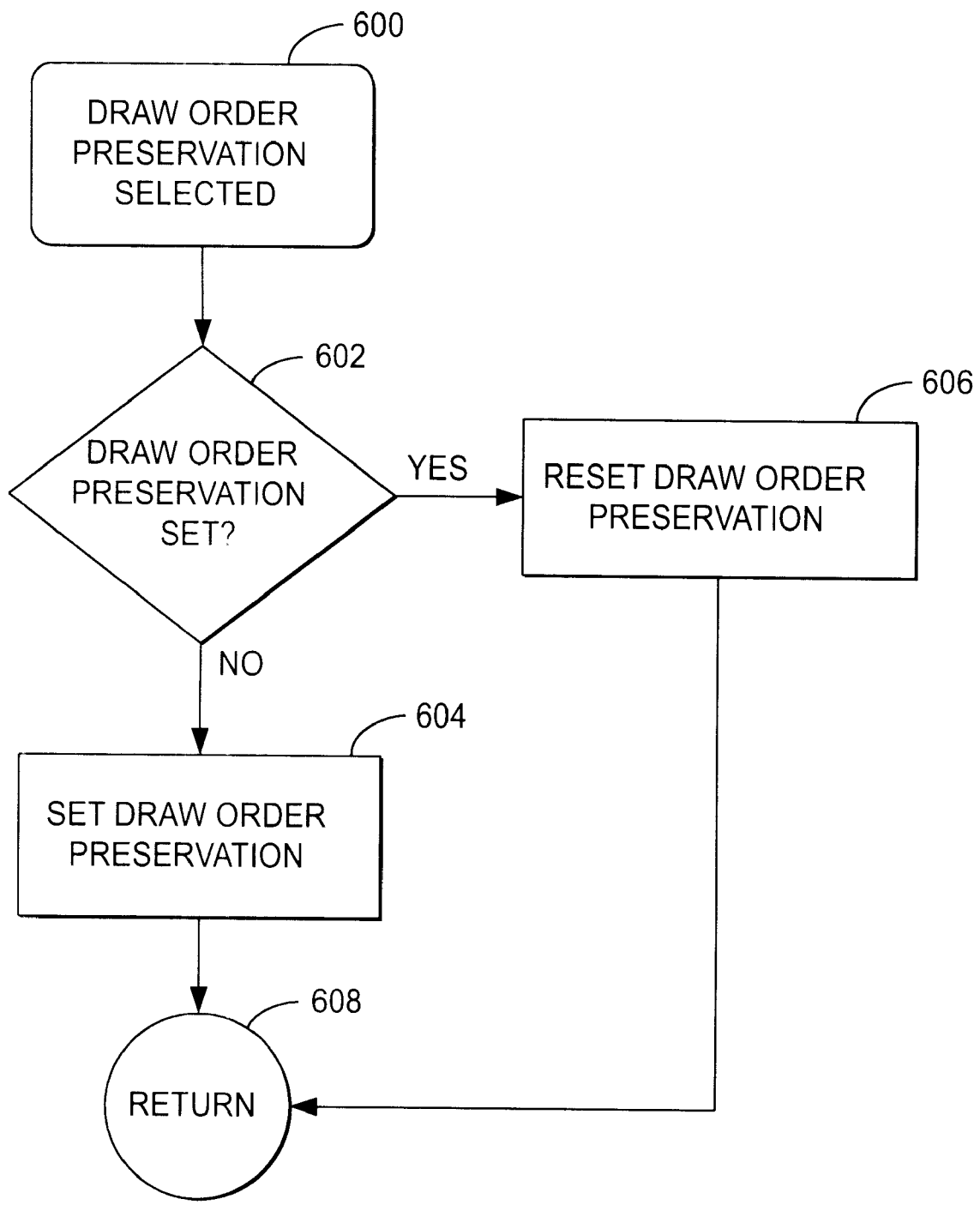
FIG. 6 is a flowchart that illustrates the general logic that is performed when the draw order preservation function is selected according to the preferred embodiment of the present invention.
Figure 7:
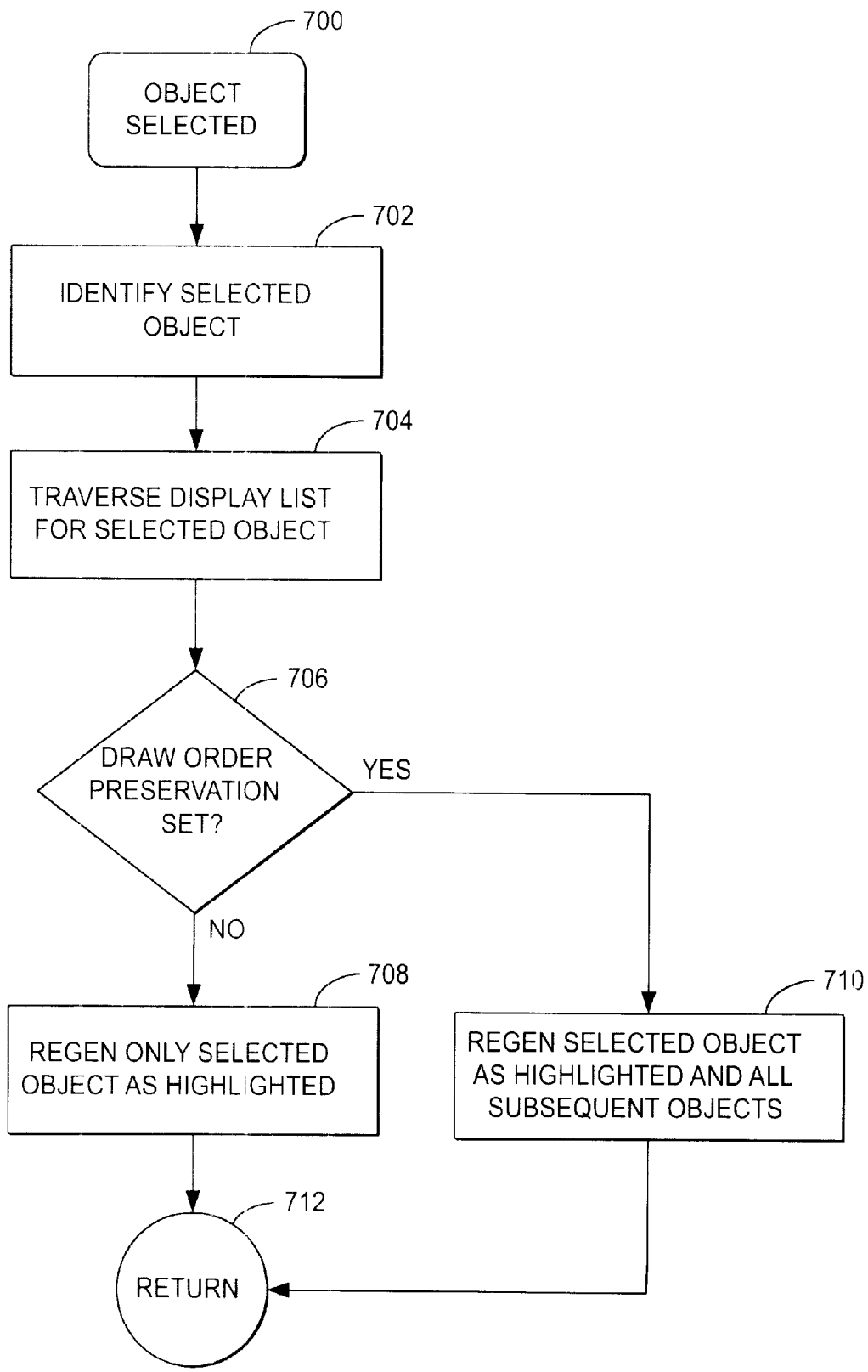
FIG. 7 is a flowchart that illustrates the general logic that is performed when an object is selected according to the preferred embodiment of the present invention.

Flowcharts which illustrate the logic of the preferred embodiment of the present invention are shown in FIGS. 5, 6, and 7. Those skilled in the art will recognize that this logic is provided for illustrative purposes only and that different logic may be used to accomplish the same results.

FIG. 5 is a flowchart that illustrates the general logic of a message or event-driven computer 100 performing the steps of the preferred embodiment of the present invention. In such a computer 100, operations are performed when transitions are made, based upon the receipt of messages or events, from present or current states to new states.

Generally, the flowchart begins by waiting at block 500 for an event (e.g., a mouse button click). It should be appreciated that, during this time, other operating system 116 tasks, e.g., file, memory, and video tasks, etc., may also be carried out. When an event occurs, control passes to block 502 to identify the event. Based upon the event, as well as the current state of the system determined in block 504, a new state is determined in block 506. In block 508, the logic transitions to the new state and performs any actions required for the transition. In block 510, the current state is set to the previously determined new state, and control returns to block 500 to wait for more input events.

The specific operations that are performed by block 508 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 100.

FIG. 6 is a flowchart that illustrates the general logic that is performed when the draw order preservation function is selected according to the preferred embodiment of the present invention. The logic begins at block 600 when the function is selected (for example, by means of selection a menu item, sequence of function keys, or in other ways known in the art).

Block 602 represents the computer 100 determining the current state of draw order preservation, i.e., whether it is set or reset. If the draw order preservation is currently reset, control transfers to Block 604 to set the draw order preservation and then to Block 608 that represents the end of the logic of FIG. 6; otherwise, if the draw order preservation is currently set, control transfers to Block 606 to reset the draw order preservation and then to Block 608 that represents the end of the logic of FIG. 6.

FIG. 7 is a flowchart that illustrates the general logic that is performed when an object 304 displayed on the monitor 110 is selected according to the preferred embodiment of the present invention. The logic begins at block 700 when the object 304 is selected (or alternatively, when a related function is invoked using some other mechanism).

Block 702 represents the computer 100 identifying the selected object 304 as well as the area surrounding its visual representation on the monitor 110.

Block 704 represents the computer 100 traversing the display and selection list 300 searching for the selected object 304. Such a traversal may be performed in any number of ways, such as via the links between the list header 302 and the various objects 304, via a simple search of the objects 304, etc.

Block 706 represents the computer 100 determining whether the draw order preservation is set. If so, control transfers to Block 708; otherwise, control transfers to Block 710.

Block 708 represents the computer 100 performing a "regen" operation for the selected object 304 as highlighted. This results in the selected object 304 being displayed on the monitor 110 in "front" of the other objects 304 in the display list 300.

Block 710 represents the computer 100 performing a "regen" operation for the selected object 304 as highlighted and all subsequent objects in the display and selection list 300 in an area occupied by the selected object 304. This step redraws at least a portion of the display occupied by the selected object 304 in a manner that visually identifies the selected object while preserving a draw order of the objects displayed on the monitor. This results in the selected object 304 being displayed on the monitor 110 in the same manner before, i.e., preserving the draw order of all of the objects 304 in the display list 300.

Finally, Block 712 represents the end of the logic of FIG. 7.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any software program, application or operating system having a user interface could benefit from the present invention.

In summary, the present invention discloses a method, apparatus, and article of manufacture for providing a user-selectable option for preserving draw order upon selection of an object displayed on a monitor. Once the object is selected from among a plurality of objects displayed on the monitor, at least a portion of an area displayed on the monitor is redrawn in a manner that visually identifies the selected object while preserving a draw order of the objects displayed on the monitor.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for selecting an object displayed on a monitor attached to a computer, comprising:

(a) providing a selectable option to preserve or not preserve a draw order of a plurality of objects displayed on the monitor;

(b) selecting one of the plurality of objects displayed on the monitor;

(c) if the option to preserve is set, redrawing at least a portion of an area displayed on the monitor in a manner that visually identifies the selected object while preserving a draw order of the objects displayed on the monitor in response to the selecting step; and (d) if the option to preserve is not set, displaying the selected object in front of the other objects displayed on the monitor in response to the selecting step.

2. The method of claim 1, wherein the redrawing step comprises redrawing at least a portion of an area surrounding the selected object in a manner that visually identifies the selected object while preserving the draw order of the objects displayed on the monitor.

3. The method of claim 1, wherein the redrawing step comprises redrawing at least a portion of the plurality of objects displayed on the monitor with the selected object in a manner that visually identifies the selected object while preserving the draw order of the objects displayed on the monitor.

4. The method of claim 1, wherein the redrawing step comprises redrawing the selected object as a highlighted object.

5. The method of claim 1, wherein the selected object is a raster image.

6. The method of claim 1, wherein at least one of the other objects is a vector object.

7. The method of claim 1, wherein the selected object is not moved in front of the other objects when the option to preserve the draw order is set.

8. The method of claim 1, wherein the option to preserve the draw order is a user-selectable option.

9. A computer-implemented system for selecting an object, comprising:

(a) a computer having a monitor attached thereto;

(b) means, performed by the computer, for:

(i) providing a selectable option to preserve or not preserve a draw order of a plurality of objects displayed on the monitor;

(ii) selecting one of the plurality of objects displayed on the monitor;

(iii) if the option to preserve the draw order is set, redrawing at least a portion of an area displayed on the monitor in a manner that visually identifies the selected object while preserving a draw order of the objects displayed on the monitor in response to the selecting; and (iv) if the option to preserve the draw order is not set, displaying the selected object in front of the other objects displayed on the monitor in response to the selecting.

10. The system of claim 9, wherein the redrawing step comprises redrawing at least a portion of an area surrounding the selected object in a manner that visually identifies the selected object while preserving the draw order of the objects displayed on the monitor.

11. The system of claim 9, wherein the redrawing step comprises redrawing at least a portion of the plurality of objects displayed on the monitor with the selected object in a manner that visually identifies the selected object while preserving the draw order of the objects displayed on the monitor.

12. The system of claim 9, wherein the redrawing step comprises redrawing the selected object as a highlighted object.

13. The system of claim 9, wherein the selected object is a raster image.

14. The system of claim 9, wherein at least one of the other objects is a vector object.

15. The system of claim 9, wherein the selected object is not moved in front of the other objects when the option to preserve the draw order is set.

16. The system of claim 9, wherein the option to preserve the draw order is a user-selectable option.

17. An article of manufacture embodying logic for performing a method for selecting an object displayed on a monitor attached to a computer, the method comprising:

(a) providing a selectable option to preserve or not preserve a draw order of a plurality of objects displayed on the monitor;

(b) selecting one of the plurality of objects displayed on the monitor;

(c) if the option to preserve is set, redrawing at least a portion of an area displayed on the monitor in a manner that visually identifies the selected object while preserving a draw order of the objects displayed on the monitor in response to the selecting; and (d) if the option to preserve is not set, displaying the selected object in front of the other objects displayed on the monitor in response to the selecting.

18. The article of manufacture of claim 17, wherein the redrawing step comprises redrawing at least a portion of an area surrounding the selected object in a manner that visually identifies the selected object while preserving the draw order of the objects displayed on the monitor.

19. The article of manufacture of claim 17, wherein the redrawing step comprises redrawing at least a portion of the plurality of objects displayed on the monitor with the selected object in a manner that visually identifies the selected object while preserving the draw order of the objects displayed on the monitor.

20. The article of manufacture of claim 17, wherein the redrawing step comprises redrawing the selected object as a highlighted object.

21. The article of manufacture of claim 17, wherein the selected object is a raster image.

22. The article of manufacture of claim 17, wherein at least one of the other objects is a vector object.

23. The article of manufacture of claim 17, wherein the selected object is not moved in front of the other objects when the option to preserve the draw order is set.

24. The article of manufacture of claim 17, wherein the option to preserve the draw order is a user-selectable option.

* * * * *